Dec. 18, 1956   F. H. JOHNSON   2,774,859
ELECTRODE
Filed July 12, 1951   2 Sheets-Sheet 1
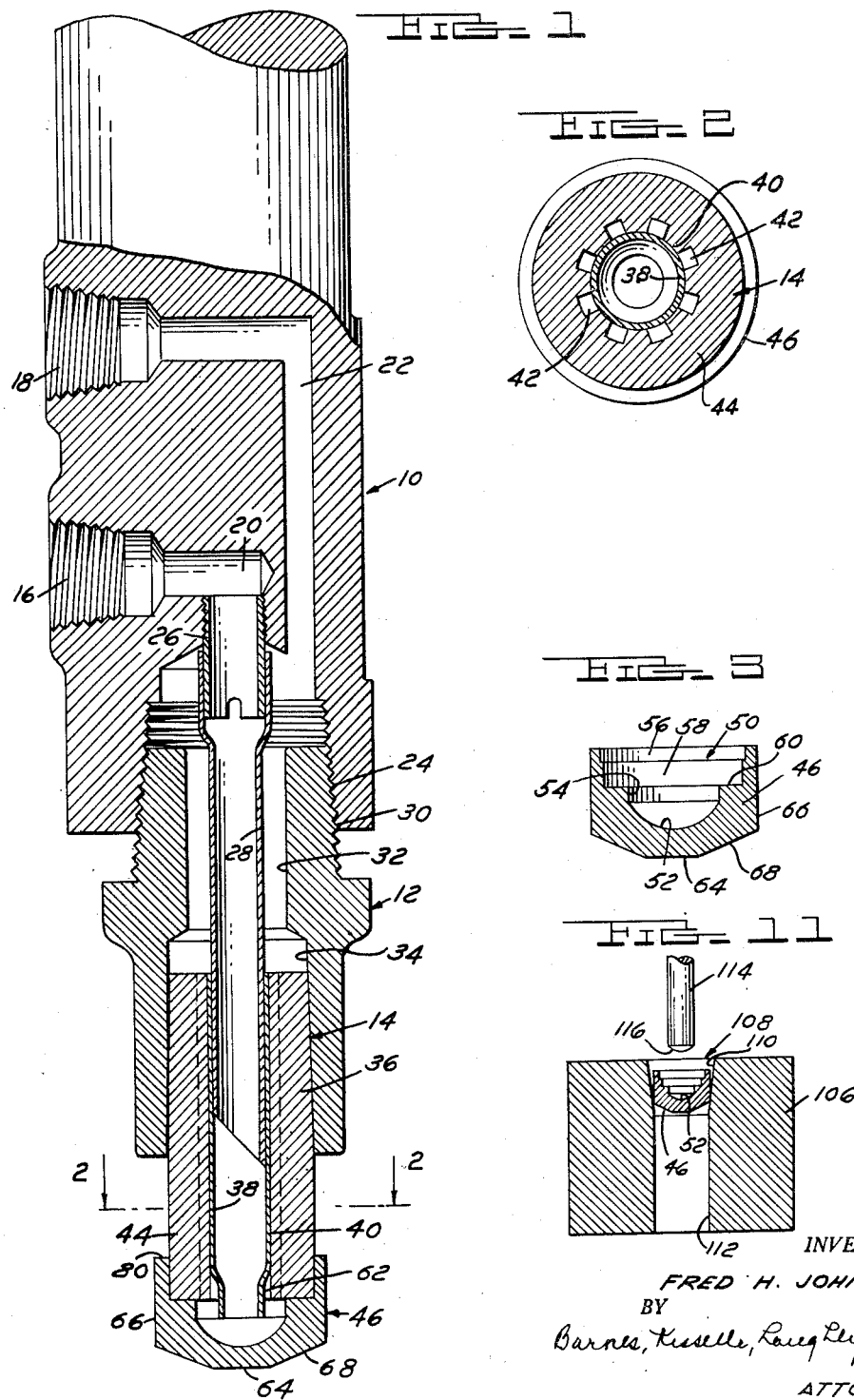
INVENTOR.
FRED H. JOHNSON
BY
Barnes, Kisselle, Laughlin & Raisch
ATTORNEYS

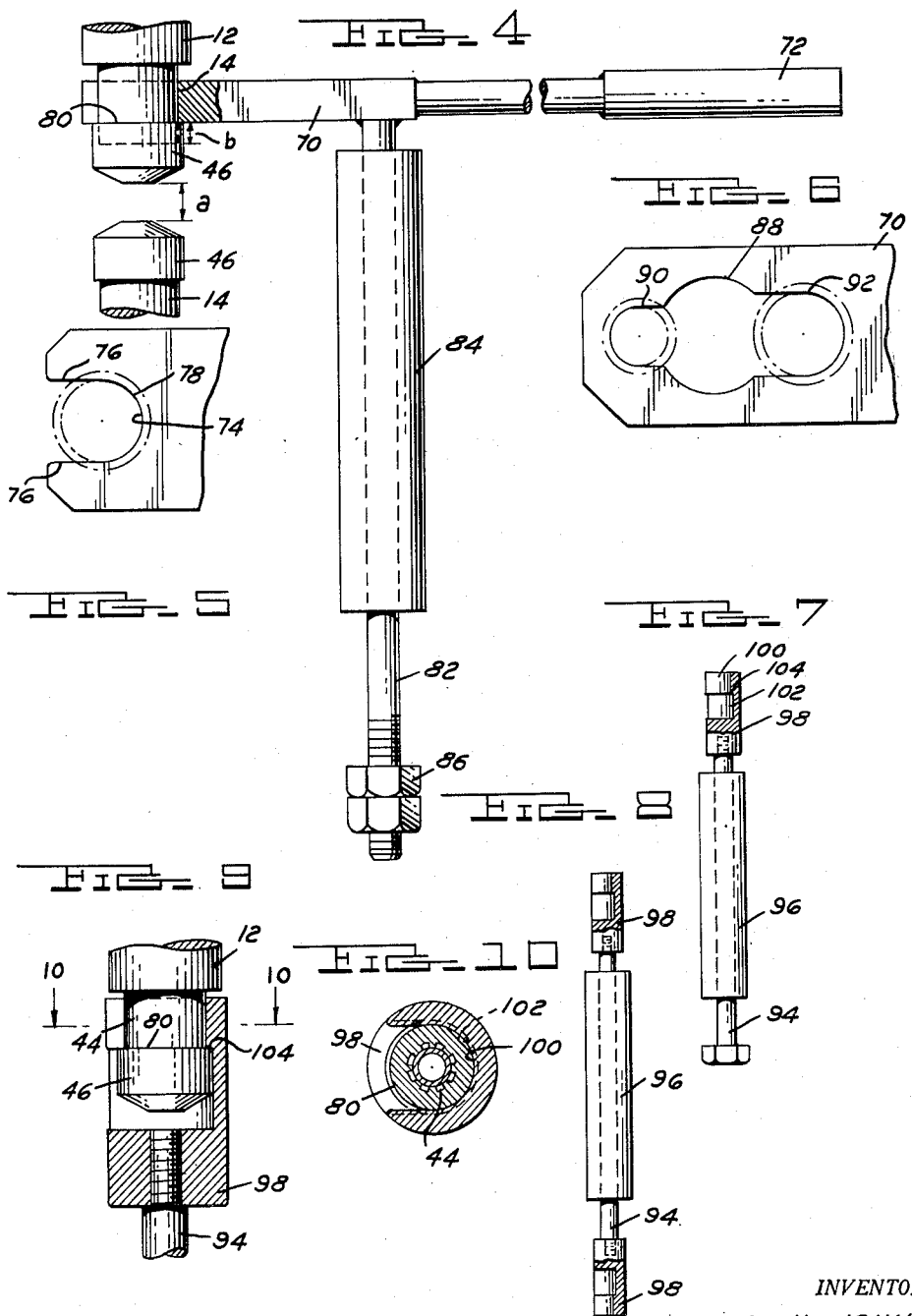

United States Patent Office 2,774,859
Patented Dec. 18, 1956

2,774,859

ELECTRODE

Fred H. Johnson, Detroit, Mich., assignor, by mesne assignments, to Warren Alloy, Warren, Mich., a copartnership Application July 12, 1951, Serial No. 236,350

10 Claims. (Cl. 219—120)

This invention relates to welding electrodes and more particularly to electrodes adapted for resistance spot welding.

In a conventional resistance spot-welding machine provided with electrodes of the type shown in United States Patent Nos. 2,379,983, 2,402,646 and 2,446,932 the electrodes each comprise a body formed with axially extending internal coolant passages and a cap at one end of the electrode body. The cap is removable from the body part and is recessed on the inside thereof to provide a communicating passage at the lower end of the electrode for the coolant passages in the body of the electrode. Coolant is caused to flow into the electrode through one of the passages and out through the other, and in so doing, the coolant withdraws heat from the cap member. The work to be welded is engaged between two electrodes and welding current is caused to flow through the electrodes and through the work so as to heat the work and cause the formation of a weld nugget. The welding operation therefore causes a localized intense heating of the electrodes, and for efficient operation of the welding machine the flow of coolant through the electrode must be adequate to maintain the cap at the work-engaging end of the electrode in a relatively cool condition.

One of the problems associated with various types of electrodes, including those of the type disclosed in the above referred to patents, resides in the inability to provide a cap structure which can be applied or removed from the end of the electrode with facility and nevertheless obtain a very tight leak-proof joint. It has been proposed heretofore to obtain the leak-proof joint by bonding the cap to the end of the electrode or by forming the cap and the electrode with interengagable sliding surfaces. When the cap is bonded to the electrode such as by solder or the like, there arises the necessity for applying heat to the joint between the electrode and the cap in order to remove the cap from the electrode and replace it with another cap. In those arrangements where the cap and electrode have slidably engaged surfaces, it has been found that where the fit between the cap and the electrode is sufficient to maintain the joint between them in a leak-proof condition this fit is so close as to render it difficult to slip a cap over the end of the electrode or to remove it. When it is considered that these caps are subjected to considerable wear and therefore have to be frequently removed from the end of the electrode and replaced with another cap, this problem of providing a cap which can be applied and removed from the end of the electrode with facility and, at the same time, providing a leak-proof joint becomes of considerable importance.

I have also found that in order to obtain the maximum cooling efficiency of a welding electrode, the tip or cap at the end of the electrode should be ground to a particular contour and this end contour should be maintained with various types of electrodes with which I am familiar. I have found that, when the electrode tip or cap becomes worn, the operator of the welding machine has a tendency to remove the welding tip and grind it while holding it manually to what he supposes is the correct contour. If the welding tip is sufficiently large to handle conveniently and safely while grinding it manually, this is a natural tendency on the part of the operator. The difficulty with this procedure is that, when these welding tips are refinished manually, they are not provided with the exact contour required to produce the maximum efficiency.

It is therefore an object of this invention to provide a cap for a welding electrode which is quickly and readily mounted on or removed from the end of the electrode. In addition, the cap is made sufficiently small so that it is inconvenient to hold the cap manually to regrind the working end thereof. Under such circumstances, the welding machine operator will find it more convenient to remove the cap when worn and replace it with another cap which has been ground on a fixture to the proper dimension and contour rather than grinding the removed cap himself while holding it manually.

Another object of this invention is to provide an electrode of the type described which is designed to maintain the cap at the working end of the electrode relatively cool and thereby reduce the frequency with which such cap members have to be replaced and, at the same time, produce better welds.

A further object of the invention resides in the provision of a welding electrode constructed such that the cap may be readily removed and replaced without removing the electrode from its holder, the arrangement being such that, when the cap is assembled on the end of the electrode body, a leak-proof joint is provided and the cap is, at the same time, automatically located in a predetermined position with respect to the coolant passages in the electrode body such as to produce a most efficient cooling of the electrode.

More specifically, the invention contemplates an electrode provided with a cap member which may be applied to the end of the electrode by simply positioning the cap over the end of one of the opposing electrodes and then moving the electrodes towards each other as in the welding operation to press the cap onto the end of the electrode. The leak-proof joint between the cap and the electrode is obtained by dimensioning these members such that the metal in the cap is caused to flow when the cap is pressed onto the electrode. In other words, the cap has an internal dimension slightly less than the external dimension of the electrode. In order to facilitate this assembly, the cap is formed with a pilot aperture slightly greater in size than the external diameter of the electrode so that the cap can be inserted over the end of the electrode by reason of the pilot aperture and thereafter pressed into place by bringing the electrodes together. The cap is furthermore shaped such that, when it is applied to the electrode, it forms around the electrode a shoulder which can be utilized for removing the cap from the electrode. In addition, the cap is fashioned such that the interengaged surfaces of the cap and the electrode are of a relatively short extent in a direction axially of the electrode. This enables removing the cap from the electrode while the electrode is mounted on the welding machine even though the electrodes are arranged to move in a direction away from each other only a relatively short distance.

In the drawings:

Fig. 1 is an elevational view, partly in section, showing the electrode structure and arrangement embodying the invention.

Fig. 2 is a sectional view taken along the lines 2—2 in Fig. 1.

Fig. 3 is a sectional view of the cap member shown at the lower end of the electrode in Fig. 1.

Fig. 4 is a fragmentary view of a welding machine and showing a tool for removing the cap member from the end of one of the electrodes.

Fig. 5 is a fragmentary view of the cap-engaging socket of the tool illustrated in Fig. 4.

Fig. 6 shows a modified form of socket arrangement for the tool shown in Fig. 4.

Figs. 7 and 8 are elevational views of modified forms of tools for removing the cap at the end of the electrode shown in Fig. 1.

Fig. 9 is a detail sectional view showing the manner in which the tool illustrated in either Fig. 7 or Fig. 8 may be utilized for removing the cap at the end of the electrode.

Fig. 10 is a sectional view taken along the lines 10—10 in Fig. 9.

Fig. 11 is a sectional view of a sizing die arrangement for restoring the electrode cap to its proper dimensions.

Referring to the drawings and particularly to Fig. 1, there is illustrated a welder arrangement which includes an electrode holder 10 fitted with an adapter 12 in which is mounted an electrode body 14. In a conventional spot welder two electrode holders 10 are employed and are disposed in opposing relation so that a work piece may be engaged between the free ends of the electrodes. Means connected with holders 10 are provided for passing a welding current through the two electrodes and the work piece so as to heat the work piece at the area engaged by the electrodes sufficiently to cause the formation of a weld nugget. Holder 10 is provided with a pair of threaded sockets 16 and 18 which communicate with passages 20 and 22, respectively, in holder 10 for conducting a coolant through the electrode. The lower end of holder 10 is fashioned with a threaded socket 24, the inner end of which communicates with passages 20 and 22. Passage 20 is extended into the threaded socket 24 by means of a nipple 26. An axially extending deflector tube 28 slips tightly over the end of nipple 26 and extends axially outwardly of socket 24.

Adapter 12 is arranged for mounting the electrode body 14 on the holder 10 and accordingly is externally threaded at its upper end as at 30 to threadedly engage with the socket 24. Adapter 12 has a cylindrical bore 32 at its upper end which communicates with a tapered socket 34 at the lower end of the adapter. Bore 32 is larger in diameter than the external diameter of deflector tube 28. The side wall of socket 34 and the outer surface of the shank 36 of electrode body 14 are fashioned with corresponding Morse tapers to permit the frictional retention of the electrode body 14 within the socket 34 of the adapter 12.

The electrode body 14 is fashioned with a cylindrical bore 38 in which there is press fitted a deflector tube extension 40. Extension 40 has an internal diameter such as to snugly receive the lower end of deflector tube 28. Bore 38 is provided circumferentially thereof with a plurality of axially extending fluted portions 42. It will be observed that the construction described provides a pair of coolant passages through the electrode, the one passage being formed by passage 20 and the tubular passages defined by nipple 26, deflector tube 28, and extension member 40. The other coolant passage comprises the passage 22 in holder 10 which communicates at its lower end with the portion of bores 24, 32 and 34 surrounding deflector tube 28 and the axially extending flutes 42. Sockets 16 and 18 are adapted for connection with in-flow and out-flow conduits, the conduits (not shown) being connected into a liquid coolant refrigerating system.

The lower end of electrode body 14 is provided with a cylindrical shank portion 44 over the end of which is positioned a cap 46. Cap 46, as is illustrated more clearly in Fig. 3, is fashioned with an internally stepped bore 50 which terminates at the inner end of the cap in a semi-spherical recess 52. Recess 52 connects with bore 50 by means of a relatively short cylindrical section 54 having a diameter equal approximately to the diameter of recess 52. The bore 50 comprises a portion 56 at the mouth of the cap and another portion 58 disposed between the portion 56 and the cylindrical section 54. The mouth portion 56 has a diameter only slightly greater than the external diameter of the cylindrical shank portion 44 of electrode body 14 while the intermediate portion 58 has a diameter which is slightly less than the diameter of the shank portion 44 of the electrode.

In Fig. 3 the relative diameters of these two bore portions are shown exaggerated for the purposes of illustration. In an actual embodiment the difference between these two diameters is preferably around five or six thousandths of an inch. For example, with an electrode having an outer diameter of .625", the diameter of the mouth portion 56 is preferably between .626", and .627" while the diameter of the inner portion 58 may vary from between .619" and .620". When the sizes of these members are maintained within this relative range, it will be noted that cap 46 may be quite readily inserted over the lower end of electrode body 14 to an extent corresponding to the depth of the mouth portion 56. However, since the diameter of the intermediate portion 58 is slightly less than the external diameter of the electrode, the cap can be inserted over the end of the electrode to the position indicated in Fig. 1 only by the application of an axial force on cap 46. It will be observed that a shoulder 60 limits the position to which the cap 46 may be pressed on the end of electrode body 14.

As is seen clearly in Fig. 1, the lower end 62 of deflector tube extension 40 extends beyond the lower end of electrode body 14, and when the cap is assembled with the body of the electrode, this extending portion 62 projects into the recess in cap 46 below shoulder 60. The portion 62 is ensmalled so that the flow of fluid through extension 40 is somewhat restricted at this point.

I have found that, in order to obtain consistently good spot welds, the work-engaging face of cap 46 should be maintained in a predetermined contour. The contour preferred is that illustrated in Fig. 3 wherein the extreme end face 64 of the cap is connected with the side walls 66 of the cap by a beveled or frusto-conical portion 68. The face 68 is inclined to the end face 64 preferably at an angle of about 20° and the diameter of the end face 64 is maintained at a predetermined dimension. After continued use, the relationship between faces 68 and 64 may become altered, and it then becomes necessary to replace cap 46 with another cap having the predetermined shape and size required. The worn cap may then be remachined in a suitable fixture to provide the cap with the desired predetermined relationship between faces 64 and 68.

In Figs. 4 through 10 there are shown several forms of tools that may be employed for removing cap 46 from the lower end of electrode body 14. The tool illustrated in Figs. 4 and 5 comprises a substantially flat bar 70 to one end of which there is secured, as by welding, a handle 72. The opposite end of bar 70 is fashioned with a U-shaped recess or socket 74 having parallel side edges 76 which are tangential to a semi-cylindrical portion 78. The diameter of the portion 78 and the spacing between edges 76 are only slightly larger than the external diameter of the shank portion 44 of body member 14 so that portions of bar member 70 surrounding socket 74 may be engaged with the upper circumferential edge portion 80 of cap 46 by inserting the open end of the socket around the shank 44 between cap 46 and the lower end of adapter 12. A spindle 82 is secured, as by welding, to the bar member 70 so as to extend perpendicularly therefrom. A weighted handle member 84 is slidably arranged on spindle 82, the lower end of spindle 82 being threaded to receive a pair of lock nuts 86. When it is desired to remove cap 46 from the electrode, the tool is engaged with the shank 44 with the portions surrounding the U-shaped recess 74 of bar 70 resting upon the upper edge portion 80 of the cap. When the tool is engaged with the electrode in this manner and supported by the operator with one hand on the handle portion 72, the slidable handle portion 84 may be brought downwardly with a sharp blow against lock nuts 86, and the cap 46 is thereby withdrawn from the end of electrode body 14.

In the arrangement illustrated in Fig. 4 it will be observed that in order to remove the cap 46 from the end of the electrode body 14 the cap must be moved downwardly the distance $b$, that is, a distance corresponding to the depth of the bore portions 56 and 58 of the cap. This distance, it will be observed, is less than the clearance $a$ between the ends of the two opposing electrodes of the welding machine. The clearance $a$ represents the distance between the ends of the electrode during the normal operation of the machine. This distance is only sufficient to permit insertion between the electrodes of the work pieces to be welded. In many machines with which I am familiar the distance through which the tip or cap of the electrode must be moved axially to remove the tip from the body of the electrode is greater than the clearance $a$ between the end faces of the opposing electrodes. With such machines, it has heretofore been necessary to remove the electrode from the holder before the cap or tip can be removed from the electrode. The cap of this invention, it will be observed, can be removed from the end of the electrode without removing the electrode from the machine.

In Fig. 6 there is illustrated a somewhat differently shaped opening at the end of bar 70. The opening illustrated in Fig. 6 comprises a central circular portion 88 having a diameter larger than the largest cap with which the tool is contemplated to be used. On one side of opening 88 there is provided a generally semi-circular opening 90 for electrodes of small diameter and on the other side with a similar opening 92 adapted for use with electrodes of various diameters.

In Figs. 7 through 10 there is illustrated another form of tool for removing the cap 46 from the lower end of the electrode. In this embodiment the tool includes a shank portion 94 on which a weighted handle member 96 is slidably supported. The shank 94 is provided either at one end, as shown in Fig. 7, or at both ends, as shown in Fig. 8, with socket members 98. Members 98 are fashioned with a stepped internal bore comprising a portion 100 and a second portion 102. The bore portion 100 at the free end of member 98 has a diameter corresponding to the diameter of shank 44 and the enlarged bore portion 102 has a diameter corresponding to the external diameter of cap 46. These two bore portions are connected by a flat shoulder 104, and the member 98 is slotted at one side thereof to permit engaging the socket with the cap 46 as illustrated in Fig. 9. When thus engaged, the bore portion 100 embraces shank 44 and the bore portion 102 embraces cap 46 with the shoulder 104 engaging and resting upon the circumferential edge portion 80 of the cap. When the socket member 98 is thus engaged with the electrode, the handle portion 96 may be brought downwardly with a sharp blow to remove the cap 46 from the tool body portion 14. In the tool illustrated in Fig. 8 the socket members 98 at each end of spindle 94 are of different sizes so that a single tool may be used with differently sized electrodes. It will be noted that the spacing required between opposed electrodes to enable removal of a cap member need only be equal to the distance between the lower end of extension 40 and the upper edge of cap 46.

After cap 46 is removed from the end of an electrode, it may be replaced by a similar cap by simply slipping the replacement cap over the lower end of electrode body 14 and thereafter moving the upper and lower electrode holders 10 toward each other so as to force cap 46 over the end of the electrode with a pressure-tight fit. It will be observed that in this operation the bore portion 56 forms a convenient means for centering the cap 46 on the end of electrode body 14. Since the bore portion 58 is slightly smaller in diameter than shank 44, it will be appreciated that the upper side wall portions of cap 46 are expanded when the cap is forced on the end of the electrode. The cap removed may be restored to the desired dimensions by simply pressing it through a sizing die such as is illustrated in Fig. 11. The die arrangement includes a die 106 having a bore 108, the upper end of which is provided with a taper as at 110 which merges with a cylindrical portion 112 having a diameter corresponding to the original outer diameter of cap 46. A punch 114 having a rounded nose 116, the radius of which corresponds to the radius of recess 52 on the cap, may be employed for driving the cap through the bore 108. The enlarged or expanded cap fits freely in the tapered portion 110 and, as the cap is driven downwardly by punch 114, the side walls are contracted to their original desired dimension.

In operation coolant is directed through the passage 20 and downwardly through nipple 26, deflector tube 28, and extension 40. The coolant flows downwardly through the projecting end 62 of extension 40, impinges against the wall of recess 52, and is directed upwardly through the flutes 42 to the bore portion 32, passage 22, and out of the holder 10.

I have found that the provision of the ensmalled projecting portion 62 at the lower end of extension 40 produces a venturi effect on the coolant flowing therethrough. This venturi effect, combined with the spherical shape of recess 52, produces a most efficient cooling of cap 46. I am unable to explain the exact reason for improved cooling of this construction but actual tests have shown that, when a welding machine is operated with an electrode of the described construction in one holder 10 and a conventional electrode in the opposite holder, the conventional electrode becomes heated to an extent such that it is too hot to touch with the hands, while my electrode is heated only a very slight amount and can be readily handled.

I have found also that the effectiveness with which cap 46 is cooled also depends upon the extent to which extension 62 projects downwardly beyond the end of electrode body 14 and into the recess in the cap.

It will be observed that with the electrode arrangement herein described, after the extension 40 is once positioned in body 14 in the position which produces the most efficient cooling, cap 46 may be removed and replaced with a similar cap without in any way altering the cooling characteristics of the electrode. Extension 40 is fixedly positioned in body 14, and the shoulder 60 on cap 46 insures a consistent spacing between the lower end of extension 62 and the wall of recess 52. By incorporating these features in my electrode, it will be observed that no adjustment of the electrode on the part of the operator is either necessary or permissible. All that is necessary on the part of the operator is to fit the cap 46 on the body 14 so that the lower end of the shank portion 44 seats upon the shoulder 60 of the cap.

I have also found that the performance of the electrode may be still further improved by plating the exterior side wall surface and the lower end face of electrode body 14 with a metal which increases the electrical conductivity of the electrode body and its associated parts. I have found, for instance, that very good results are obtained when the outer side wall surface and the lower end face of body 14 is plated with silver or silver oxide. The conductivity of the assembly may be further increased by electroplating, such as with silver or silver oxide, the side wall surfaces of the bore 50 and shoulder 60 in end cap 46. Silver plating of these surfaces not only increases the electrical conductivity of the electrode but also enhances the wearing qualities of the electrode body 14 and the end cap 46. As an alternative, I have found it also desirable to silver plate only the lower end face of electrode body 14 and the shoulder 60 of end cap 46. The exterior side wall surface of electrode body 14 and the side wall surfaces of bore 50 may then be plated with chromium or nickel to produce hard and long-wearing surfaces on those portions of the electrode body and cap which are subjected to severe wear because of the frequency with which the caps and the electrode body are replaced.

It will thus be seen that I have provided a simply constructed resistance welder electrode which makes for the production of consistently good spot welds. The more efficient cooling of the electrode reduces the frequency with which the work-engaging caps must be replaced, and the particular cap construction disclosed not only simplifies the removal and replacement of the caps but also insures the accurate positioning of the cap at the end of the electrode so as to obtain the desired uniform cooling effect without any adjustment required on the part of the operator.

It will also be observed that the relationship between the dimensions of the cap and the operative end of the electrode which necessitates a flow of metal in the wall of the cap in order to secure the cap to the end of the electrode insures an absolutely leak-proof joint between these members. The metal flow, however, is not such as to render the cap useless after it has been removed. The metal is expanded only a slight amount and the cap may be brought back to its original dimension by the simple apparatus illustrated in Fig. 11.

I have found that the cap construction disclosed herein is especially adapted for use on projection welding machines wherein a series of rather closely spaced electrodes are arranged on a welding head. In this type of welder the caps can be readily removed and replaced with other caps, since the caps of my construction do not require a relatively wide spacing of the electrodes.

I claim:

1. A welding electrode comprising a body having an axial bore, a cap member at one end of the body, and a tubular member within said bore, said tubular member providing a central passage through said body for coolant and cooperating with said bore to define a second coolant passage concentric with said first coolant passage, said tubular member extending to the end of said body provided with said cap and being internally ensmalled at said end, said cap having a recess on the inner face thereof which communicates with said passages and through which coolant may circulate.

2. The combination set forth in claim 1 wherein said internally ensmalled portion of said tubular member projects outwardly beyond the corresponding end of said body and into said recess.

3. An electrode comprising a body provided with a work-engaging cap at one end, a tubular member extending axially within said body and defining concentric in-flow and out-flow passages through said electrode, the central passage comprising the in-flow passage, said passages extending to said end of said body and said tubular member being internally ensmalled at said end of said body to produce a venturi effect on the coolant flowing from the end of said in-flow passage, said cap member having a recess on the inner side thereof communicating with said passages and through which coolant may circulate from the in-flow passage to the out-flow passage.

4. The combination set forth in claim 3 wherein said recess is generally semi-spherical in shape.

5. The combination set forth in claim 3 wherein the outer face of said cap opposite said recess forms a work-engaging surface, said work-engaging surface being flat and connected with the side walls of said cap by a frusto-conical surface.

6. The combination set forth in claim 3 wherein said ensmalled end portion of said tubular member projects outwardly beyond the adjacent end of said body and into said recess.

7. The combination set forth in claim 3 wherein said tubular member is fixedly secured within said body, said ensmalled end portion projecting outwardly beyond the adjacent end of said body and into said recess, said cap member having a shoulder thereon engaged with said body to establish a predetermined fixed spaced relation between said end of said tubular member and the surface of said recess.

8. A welding electrode comprising an elongate body having a cylindrical end portion and provided with a removable cap at said cylindrical end portion, said cap having a cylindrical opening at one end for slidable telescopic engagement over said end of said body, the mouth of said opening being slightly larger than the external diameter of said end of said body to facilitate insertion of the cap over said cylindrical end of said body and the cylindrical portion of said opening spaced inwardly of and adjacent said mouth portion being dimensioned slightly smaller than the external diameter of said end portion of said body prior to assembly.

9. A welding electrode comprising a body having a cylindrical end portion and a cap member telescopically engaged over said end portion, said body having in-flow and out-flow coolant passages therein extending to said end of said body, said cap member having a cylindrical bore therein, the mouth of said bore having a diameter slightly greater than the external diameter of said end of said body to facilitate ready insertion of said cap over said end of said body, said bore having a cylindrical portion spaced inwardly of said mouth, said last mentioned cylindrical portion having a diameter slightly less than the external diameter of said cylindrical end portion of said body prior to assembly therewith, said cap having a rounded recess spaced inwardly of said cylindrical portion, and means within said cap forming a shoulder between said recess and said cylindrical portion, said shoulder being engaged against the end face of said body.

10. The combination set forth in claim 9 wherein said cap has an external diameter larger than the external diameter of said body adjacent said cap whereby, when the cap is telescopically engaged over the end of said body, said cap provides a shoulder with which a tool may be engaged for removing said cap from telescopic engagement with the end of said body.

References Cited in the file of this patent

UNITED STATES PATENTS

| | | |
|---|---|---|
| 1,054,687 | Grigg | Mar. 4, 1913 |
| 1,096,205 | Taylor | May 12, 1914 |
| 1,933,938 | Schnetzer | Nov. 7, 1933 |
| 2,250,645 | Meadowcroft | July 29, 1941 |
| 2,379,983 | Munson | July 10, 1945 |
| 2,390,936 | Hall | Dec. 11, 1945 |
| 2,446,932 | Johnson | Aug. 10, 1948 |
| 2,471,531 | McIntyre | May 31, 1949 |
| 2,475,041 | Mattson | July 5, 1949 |
| 2,513,323 | Hensel | July 4, 1950 |